United States Patent
Stinus et al.

(10) Patent No.: US 6,854,055 B1
(45) Date of Patent: Feb. 8, 2005

(54) METHOD AND SYSTEM FOR SWITCHING ACTIVE CONFIGURATION MEMORY DURING ON-LINE OPERATION OF PROGRAMMABLE FIELD MOUNTED DEVICE

(75) Inventors: Jochen Stinus, Inzlingen (DE); Monika Banzhaf, Stuttgart (DE)

(73) Assignee: Endress + Hauser Flowtec AG, Reinach (CH)

( * ) Notice: Subject to any disclaimer, the term of this patent is extended or adjusted under 35 U.S.C. 154(b) by 517 days.

(21) Appl. No.: 09/688,681

(22) Filed: Oct. 16, 2000

Related U.S. Application Data
(60) Provisional application No. 60/204,993, filed on May 16, 2000.

(30) Foreign Application Priority Data

Oct. 18, 1999 (EP) .............................................. 99120713
Feb. 11, 2000 (EP) .............................................. 00102813

(51) Int. Cl.[7] .............................. G06F 9/00; G06F 12/14
(52) U.S. Cl. ....................... 713/100; 711/103; 711/152; 713/1
(58) Field of Search ............................... 713/1, 100, 2; 711/103, 152

(56) References Cited

U.S. PATENT DOCUMENTS

| | | | | |
|---|---|---|---|---|
| 5,327,531 A | * | 7/1994 | Bealkowski et al. ........... 714/6 |
| 5,372,141 A | | 12/1994 | Gallup et al. | |
| 6,081,892 A | * | 6/2000 | Lomas ........................... 713/2 |
| 6,147,509 A | | 11/2000 | Oku | |
| 6,272,628 B1 | * | 8/2001 | Aguilar et al. ................ 713/2 |
| 6,275,931 B1 | * | 8/2001 | Narayanaswamy et al. .... 713/2 |
| 6,378,068 B1 | * | 4/2002 | Foster et al. ................... 713/1 |
| 6,584,559 B1 | * | 6/2003 | Huh et al. ...................... 713/2 |

FOREIGN PATENT DOCUMENTS

| | | | |
|---|---|---|---|
| EP | 0 887 729 | 12/1998 | |
| JP | 02029883 A | * 1/1990 | ........... G06F/15/74 |
| JP | 9062528 | 3/1997 | |
| JP | 09091165 | 4/1997 | |
| JP | 11260928 | 9/1999 | |

* cited by examiner

Primary Examiner—Lynne H. Browne
Assistant Examiner—Eric Chang
(74) Attorney, Agent, or Firm—Bacon & Thomas

(57) ABSTRACT

To program the device during running of a computational process in device electronics, the device having an activated first memory area storing a first programmable configuration and a deactivated second memory area storing a second programmable configuration. The second programmable configuration is modified. Simultaneously, the first programmable configuration in the first memory area is executed by the computational process. Upon completion of configuring the second memory area, the first memory area is deactivated and the second memory area is activated for executing by the computational process.

33 Claims, 4 Drawing Sheets

METHOD AND SYSTEM FOR SWITCHING ACTIVE CONFIGURATION MEMORY DURING ON-LINE OPERATION OF PROGRAMMABLE FIELD MOUNTED DEVICE

This application claims benefit of provisional application Ser. No. 60/204,993 filed May 16, 2000.

FIELD OF THE INVENTION

This invention relates to a programmable field mounted device with field mounted device electronics and to a method of reconfiguring the latter.

BACKGROUND

In process automation technology, analog or digital measurement signals representative of process variables are preferably generated using field mounted devices. The process variables may represent, for example, mass flow rate, tank contents level, pressure, temperature, etc., which are sensed with suitable sensors.

Such field mounted devices are commonly connected with one another and with associated process control computers via a suitable data transmission system, to which they send measurement signals via, e.g., a 4- to 20-mA current loop and/or via a digital data bus. For the data transmission systems, field bus systems, particularly serial systems, such as Profibus-PA, Foundation Fieldbus, CANbus, etc. and the corresponding communications protocols are used.

By means of the process control computers, the transmitted measurement signals are processed and visualized as corresponding measurement results, e.g., on monitors, and/or converted to control signals for actuators, such as solenoid valves, electric motors, etc.

Besides their primary function, namely to generate measurement signals, present-day field mounted devices have various additional functionalities which support an efficient and reliable control of the process to be monitored. These include such functions as self-checking by the field mounted device, storing measured values, generating control signals for actuators, etc. Because of this high functionality of the field mounted devices, process-controlling functions can be shifted increasingly to the field level, so that process control systems can be organized as correspondingly decentralized systems. These additional functionalities also relate, for example, to the start-up of the field mounted device and to its connection to the data transmission system.

These and further functions of field mounted devices are commonly implemented using field mounted device electronics, which comprise a microcomputer and suitable software that is part of the microcomputer. The software is programmed into a permanent storage, such as a PROM, or a nonvolatile, persistent storage, e.g., an EEPROM, of the microcomputer prior to or during the start-up of the field mounted device, and, for the operation of the field mounted device, can be loaded into a volatile storage, such as a RAM.

The processes monitored by the field mounted devices are subject to constant modification both with respect to the construction of the plants and with respect to the time sequences of individual process steps. Accordingly, the field mounted devices must be adapted to changing process conditions and further developed. This applies to the sensors, but particularly also to the implemented functions, such as the control of the sensor, the processing of the measurement signals, or the presentation of the measurement results, and to the communication with the data transmission system.

For such reconfigurations of the functions implemented in the field mounted device electronics, corresponding modifications of the stored software are necessary in programmable field mounted devices. Such reconfigurations are commonly made in situ via a control unit connected to the field mounted device, and may comprise, for example, changes to individual instrument parameters or the loading of complete processing programs.

One way of implementing the reconfigurations is to replace the storages containing software to be modified by storages containing the modified software, which can be done, for example, by rearranging individual storage elements or replacing the respective memory boards. This necessitates opening the housing of the field mounted device, so that the latter must be switched off.

Another disadvantage is that during such a reconfiguration, the affected plant sections also may have to be shut down.

If nonvolatile storage devices are used for storing the software, another possibility of reconfiguring the field mounted device electronics is to download the modified software from a mass storage, e.g., a diskette, a CD-ROM, or a magnetic tape, via a download bus into a volatile storage of the signal processing unit, e.g., into a RAM. The software to be modified can then be erased in the nonvolatile storage and be replaced by the software contained in the volatile storage.

For these reconfigurations, the housing of the field mounted device need not be opened; however, the field mounted device must be switched off-line, i.e., it must be put out of operation. This reduces the reconfiguration time considerably, but a shutdown of affected plant sections cannot be ruled out.

Another disadvantage of such a reconfiguration is that 5 the software to be modified is no longer loaded while the modified software has not been completely loaded yet. The longer this condition lasts, the higher the probability that external disturbances, such as power supply variations, will occur. Because of the relatively high power requirement for writing to nonvolatile storages and because of the generally small energy reserves in field mounted devices, particularly in fail-safe devices, this may result in the software to be loaded being erased from the volatile storage and thus being not available for the reconfiguration. Accordingly, the reconfiguration will terminate uncompleted. This erroneous condition can be overcome, for example, by resetting the microcomputer to preprogrammed default settings and reloading the software, but this prolongs the downtime of the field mounted device and possibly of the affected plant section.

In many cases, however, a reduction of error probability by increasing the available electric power using, for example, additional, energy-storing accumulator and/or capacitance networks conflicts with the demand for field mounted device electronics with minimum space and power requirements and with minimum circuit complexity. Furthermore, for many applications, particularly in hazardous areas, the storage capacity of energy storage circuits is limited by relevant standards to a maximum energy reserve.

SUMMARY

It is therefore an object of the invention to provide a programmable field mounted device, particularly an intrinsically safe field mounted device, comprising field mounted device electronics which are reconfigurable during on-line operation and which during and after the reconfiguration are not placed in an undefined or erroneous state caused by this reconfiguration. Furthermore, at least the last executed software is to be stored in the field mounted device electronics even after a power failure during reconfiguration.

To attain this object, the invention comprises a method for configuring a field mounted device having a memory, the method comprising the steps of:

running a computational process having data read access to an activated first memory area storing a programmable first device configuration;

deactivating the first memory area, wherein said step comprises precluding said computational process from accessing the first memory area; and activating a deactivated second memory area storing a programmable second device configuration, wherein said step comprises granting said computational process data read access to the second memory area.

Preferred embodiments and developments of the method of the invention are defined by the respective subclaims.

Furthermore, the invention consists in a programmable field mounted device, comprising:

a memory circuit including a plurality of memory areas, each memory area storing program codes, each memory area selectively activated;

a control circuit configured to generate a selection signal, the selection signal activating one of the plurality of memory areas to create an activated memory area containing a first programm code representing a first device configuration, and deactivating the one of the remaining memory areas to create a deactivated memory area for storing a second programm code representing a second device configuration.

Prefered embodiments and developments of the object of the invention are defined by the respective subclaims.

Further, the invention consists in a method for programming a field mounted device running a computational process, the method comprising the steps of:

activating a first memory area storing a first programmable configuration;

deactivating a second memory area storing a second programmable configuration;

configuring the second memory area with a modification of the second programmable configuration; and coordinating the configuration of the second memory area with the computational process, the coordination of the configuration of the second memory area including the steps of simultaneously executing the first programmable configuration in the first memory area by the computational process during configuration of the second memory area with a modification of the second programmable configuration, deactivating the first memory area storing the first programmable configuration upon completion of configuring the second memory area with a modification of the second programmable configuration, and activating the second memory area upon completion of configuring the second memory area with a modification of the second programmable configuration.

Prefered embodiments and developments of the method of the invention are defined by the respective subclaims.

One advantage of the invention is that during reconfiguration, the first program code, which represents the current configuration of the field mounted device electronics, can be loaded unchanged, so that the software being executed is always in a consistent state. Since the field mounted device electronics are operational during reconfiguration, the latter can also be carried out while the field mounted device is in operation.

Another advantage of the invention is that the deactivation of the first configuration and the activation of the second configuration take place simultaneously and, even in the event of a failure of the external power supply, can be reliably and consistently completed using the energy reserves commonly stored in such field mounted devices, particularly in intrinsically safe devices.

The invention and further advantages will become more apparent by reference to the following description of embodiments taken in conjunction with the accompanying drawings. Like reference characters have been used to designate like elements throughout the various figures; where appropriate, reference characters that were already, introduced are not repeated in subsequent figures.

DETAILED DESCRIPTION OF THE DRAWINGS

Figure 1:
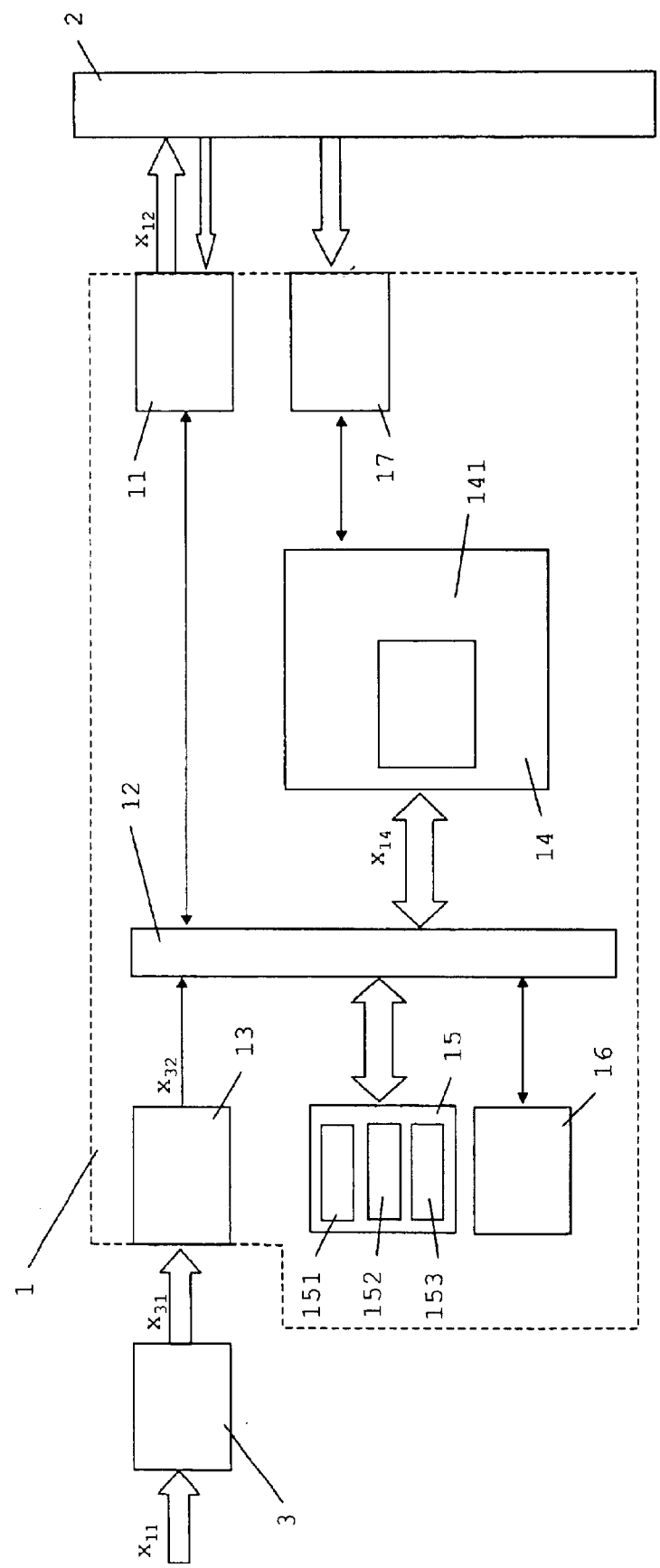
FIG. 1 is a schematic block diagram of an embodiment of a programmable field mounted device with field mounted device electronics.

While the invention is susceptible to various modifications and alternative forms, exemplary embodiments thereof have been shown by way of example in the drawings and will herein be described in detail. It should be understood, however, that there is no intent to limit the invention to the the particular forms diclosed, but on the contrary, the intention is to cover all modifications, equivalents, and alternatives falling within the pirit and scope of the inevntion as defined by the intended claims.

FIG. 1 shows, in block-diagram form, an embodiment of a field mounted device which serves to generate at least one analog or digital measurement signal $x_{12}$ that is representative of a process variable $x_{11}$, e.g., a tank contents level, a volumetric and/or mass flow rate of a moving fluid, a pressure, or a pH value and/or a temperature of a medium, etc.

To send data, e.g., the measurement signal $x_{12}$, to other process-monitoring and/or process-controlling information systems, e.g., to a stored-program controller and/or a process control computer, and/or to receive data, e.g., settings, the field mounted device comprises field mounted device electronics 1, which are coupled to an external bus system 2 via a communications interface 11. Such bus systems, e.g., Profibus-PA, Foundation Fieldbus, CANbus, etc., besides transmitting data, also serve to conduct power to the connected field mounted devices.

For communications interface 11, both a two-wire interface, such as the standard interface RS-485 or a 4- to 20-mA current loop, and a multiwire interface, such as the standard interfaces RS-422, TTY, etc., as well as the corresponding communications protocols can be used.

Depending on the design of communications interface 11, the field mounted device is connectable to bus system 2 either directly or via remote I/O modules. In the latter case, use can be made of a smart protocol, such as HART, INTENSOR, etc., in which analog measurement signal $x_{12}$ is frequency-or amplitude-modulated to transmit digital data.

According to a preferred development of the invention, a sensor 3, which responds to process variable $x_{11}$, is connected to the field mounted device. Sensor 3 converts process variable $x_{11}$ into a sensor signal $x_{31}$ representing the process variable, particularly into an analog signal, such as a signal current, a signal voltage, or a frequency signal. Sensor 3 may be, for example, a Coriolis mass flow rate sensor, an electromagnetic volumetric flow sensor, a pressure transmitter, a pH electrode arrangement, a temperature sensor, a level sensor, etc.

As shown in FIG. 1, sensor signal $x_{31}$ from sensor 3 is applied to the input of a converter circuit 13 of field mounted device electronics 1, which converter circuit 13 serves to convert the signal to a digital sensor signal $x_{32}$. To accomplish this, sensor signal $x_{31}$ may be passed through an antialiasing filter, sampled, held, and digitized using suitable A/D converters. The digital sensor signal $x_{32}$ is applied from the output of converter circuit 13 via an addressable signal port to a data bus of an internal bus system 12 of field mounted device electronics 1. In addition to or in place of sensor 3, which is connected via converter circuit 13 to internal bus system 12, a further field mounted device, particularly a measured-data-transmitting device, may, of course, be connected to internal bus system 12 via a suitable interface.

Besides digitizing the sensor signal $x_{31}$, field mounted device electronics 1 serve to convert digital sensor signal $x_{32}$ to measurement signal $x_{12}$ and to generate communications protocols. Furthermore, field mounted device electronics 1 may provide drive signals to sensor 3, particularly signals serving to excite the sensor electrically or electromechanically.

Field mounted device electronics 1 are preferably contained in a single electronics housing of the field mounted device; in the case of modular field mounted devices with a sensor module and a 10 signal processing module, for example, the measuring electronics may also be distributed between the two modules.

Field mounted device electronics 1 can be implemented, for example, using conventional ASIC and/or SMD technologies.

During the service life of field mounted devices of the kind described, one or more modifications implemented in field mounted device electronics 1, which comprise, for example, recalibrations of field mounted device electronics 1, improvements in implemented evaluation procedures, and/or modifications to communications protocols, are generally initiated on the part of the user and/or on the part of the manufacturer.

In present-day field mounted devices, therefore, such signal processing routines, for which modifications are to be expected, are commonly stored persistently as fixed-programmed software. "Persistent" means that the software can, on the one hand, be read and thus executed even after a restart of field mounted device electronics 1, particularly after a power fail restart, and, on the other hand, be reprogrammed, particularly to reconfigure field mounted device electronics 1.

As shown in FIG. 1, field mounted device electronics 1 therefore comprise a control circuit 14 with at least one microprocessor 141, which has access, preferably via bus system 12, to digital sensor signal $x_{32}$ and to software persistently stored in a nonvolatile data memory circuit 15 of field mounted device electronics 1. Furthermore, external processes that communicate with field mounted device electronics 1 via bus system 2 have write and/or read access to data memory circuit 15, and thus to the stored software.

Data memory circuit 15 can be implemented, for example, with one or more EEPROM circuits. It is also possible, of course, to implement data memory circuit 15 using other nonvolatile memory circuits familiar to those skilled in the art, such as flash EEPROM, EPROM, and/or CMOS circuits.

For the implementation of fast signal processing routines, particularly of routines that are executed in real time, field mounted device electronics 1 preferably comprise a fast-access volatile data memory circuit 16 serving as a main memory, into which program codes to be frequently executed can be loaded, for example from data memory circuit 15. Data memory circuit 16 may, for instance, be coupled to control circuit 14 via internal bus system 12 and/or be incorporated as a cache memory in control circuit 14. Data memory circuit 16 can be implemented with static and/or dynamic RAM circuits, for example.

Field mounted device electronics 1 further comprise energy storage electronics 17, e.g. an energy-storing accumulator and/or a capacitance network, which preferably serve to store energy required for at least one write access to data memory circuit 15, particularly also during a failure of the power supply via bus system 2.

Figure 2:
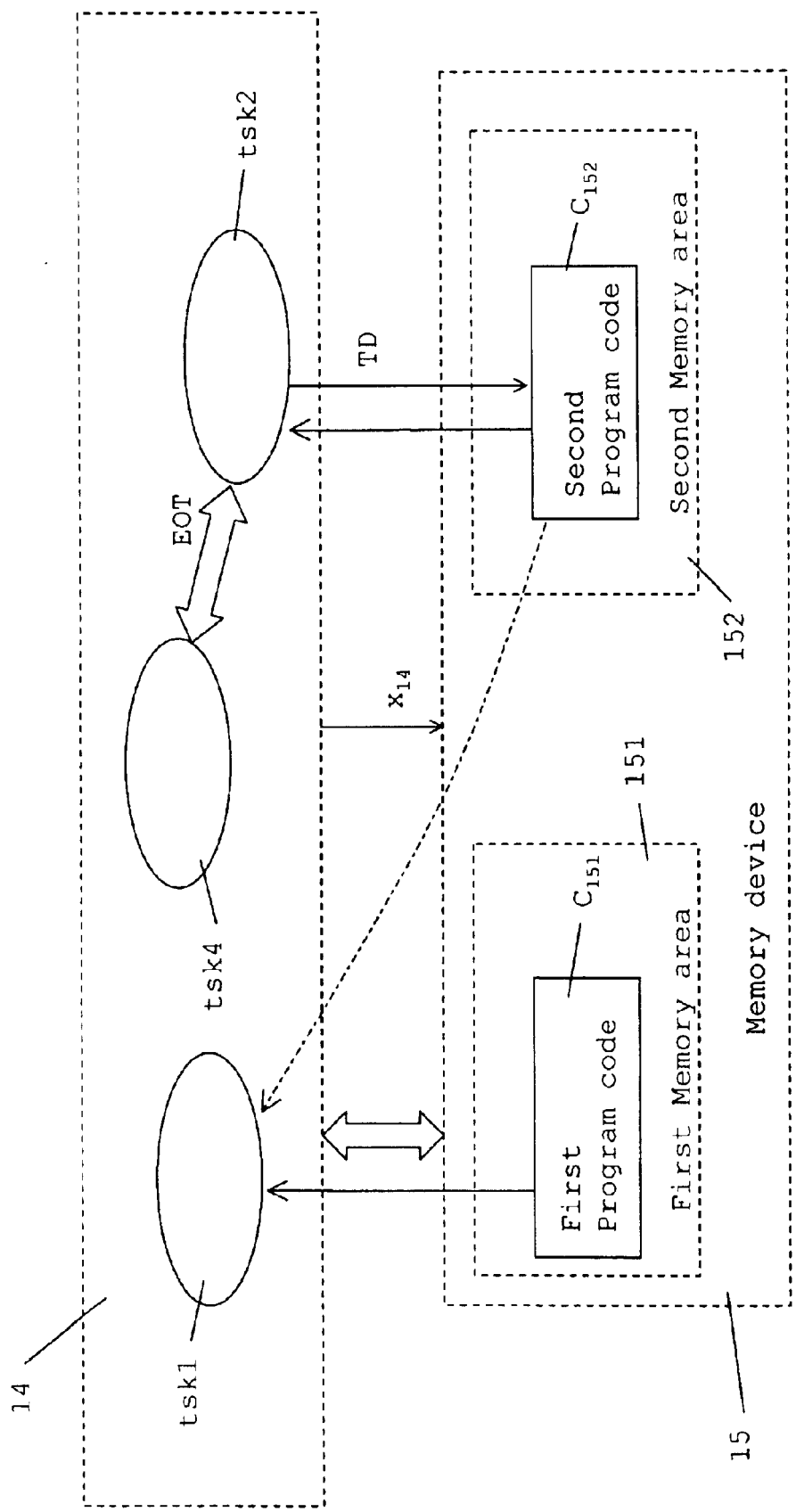
FIG. 2 is a schematic block diagram illustrating a preferred embodiment of a method of reconfiguring the field mounted device electronics of FIG. 1.

As shown in FIG. 2, the software stored in data memory circuit 15 comprises at least a first program code $C_{151}$, which represents a first configuration of field mounted device electronics 1 and occupies an activated first memory area 151 of data memory circuit 15. "Activated memory area" means that at least one computational process tsk1 running in microprocessor 141 has read access to this memory area and can execute the stored program code, e.g., program code $C_{151}$ correspondingly, "deactivated memory area" means that at this moment no computational process running in microprocessor 141 has read or write access to this memory area.

To reconfigure field mounted device electronics 1, according to an advantageous feature of the invention, program code $C_{151}$ is replaced by a second program code $C_{152}$, which serves to reprogram the implemented software and represents a second configuration of field mounted device electronics 1, such that the second program code $C_{152}$, as symbolized in FIG. 2 by a dash-dot arrow, is executable or executed by computational process tsk1 instead of program code $C_{151}$. As shown in FIG. 1, to modify the software being executed, data memory circuit 15 further comprises at least one activatable second memory area 152, which contains program code $C_{152}$. The program codes can be complete programs, such as signal processing routines generating measurement signal $x_{12}$, individual program steps, and/or calibration data for the field mounted device that are coded as program parameters.

Furthermore, routines for implementing communications as interfaces and/or for driving peripheral indicating and control elements may be stored as program codes in data memory circuit 15. Program codes of the kind described can be generated and implemented in data memory circuit 15 both by the manufacturer and by the user, particularly during or after start-up of the field mounted device.

Figure 3:
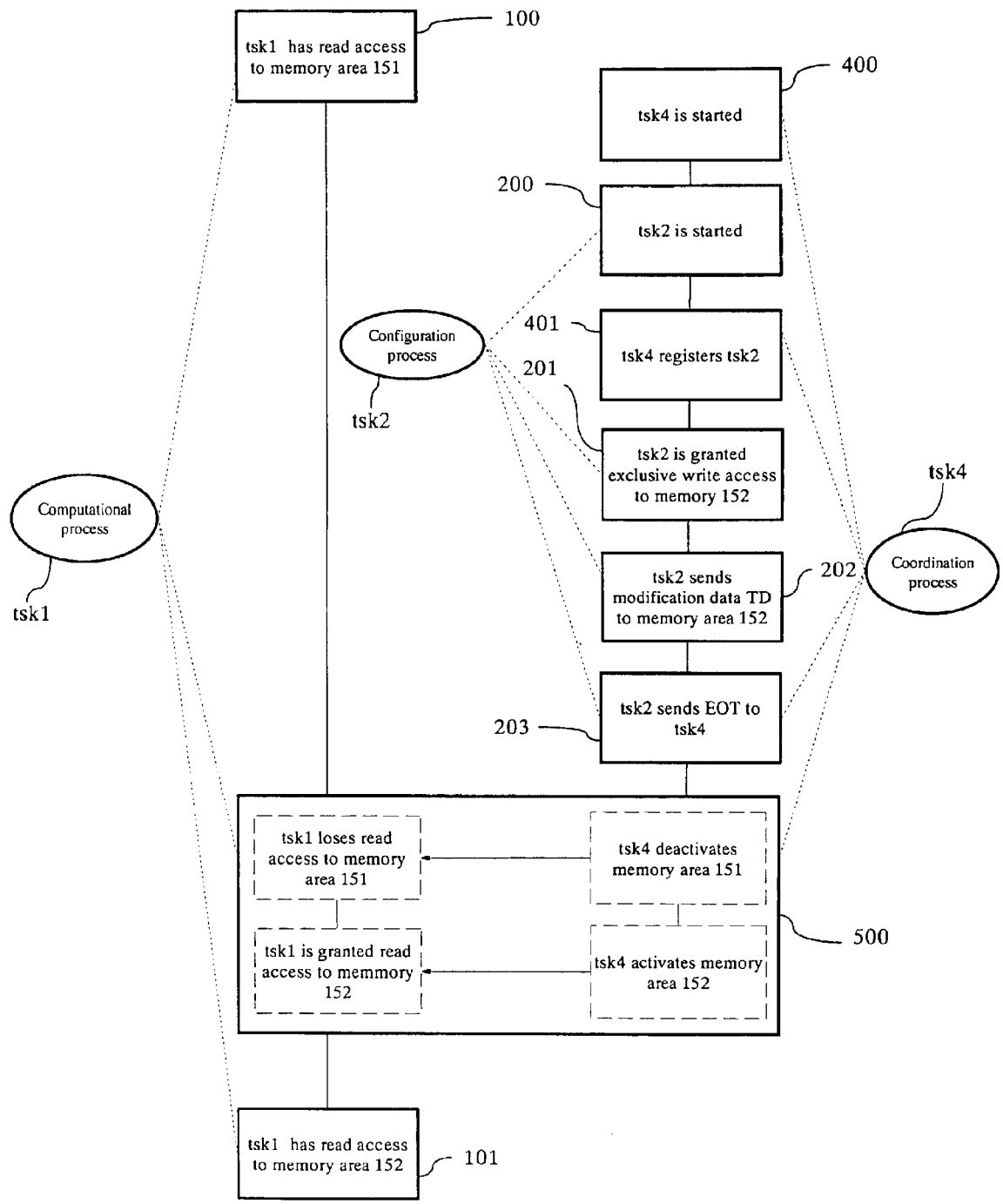
FIG. 3 is a flowchart showing the steps of the method in accordance with the invention.

As shown in FIG. 3, during operation of field mounted device electronics 1, computational process tsk1 has read access to memory area 151 during a time interval represented as step 100. In this step 100, program code $C_{151}$ is thus executed, at least temporarily, in computational process tsk1. To create program code $C_{152}$ in a further step 200, a first configuration process tsk2 is started, which sends corresponding modification data TD, e.g., manually entered data, to data memory circuit 15. To that end, configuration process tsk2 preferably has both write and read access to data memory circuit 15.

Configuration process tsk2 may be, for example, an editor program running in field mounted device electronics 1 or in an external programming device connected to communications interface 11 via the above-mentioned modem, or a routine that loads the modification data TD from a mass storage into data memory circuit 15. Configuration process tsk2 may also run on an external programming device that sends the modification data TD via bus system 2.

One advantage of the invention is that the field mounted device can remain in the measurement mode during the reconfiguration of field mounted device electronics 1, i.e., even during reconfiguration, executable software is always contained in data memory 15. To that end, as shown in FIG. 3, memory area 151 is active even after the starting of configuration process tsk2, so that at least the aforementioned computational process tsk1 can still execute program code $C_{151}$, which represents the currently valid first configuration.

In such a multiuser environment comprising computational process tsk1 and configuration process tsk2, read and/or write accesses to data memory circuit 15 must be coordinated so that executable software, particularly software conforming to the predetermined measurement tasks, is activated at all times; accordingly, modifications that may result in inconsistencies of the executed software with respect to the measurement tasks must be prevented. To accomplish this, in step 400, a coordination process tsk4 is started in control circuit 14. This coordination process tsk4 controls the read and/or write access to data memory circuit 15 by processes running in microprocessor 141, particularly by configuration process tsk2 and/or by computational process tsk1.

Coordination process tsk4 may be performed, for example, by a persistency manager of a database implemented in field mounted device electronics 1. The persistency manager may be controlled by a higher-level transaction manager of the database. This database is also persistently stored as software in data memory circuit 15. For the execution of this software, the persistency manager and, if present, the transaction manager may also be loaded into data memory circuit 16.

After the start of configuration process tsk2, in step 401, this process is registered in coordination process tsk4, which is being executed in control circuit 14.

Coordination process tsk4 then reserves the currently deactivated memory area 152 for configuration process tsk2, such that in step 201, configuration process tsk2 is granted exclusive write access to memory area 152. Thus, any configuration processes running parallel with configuration process tsk2 cannot write data into memory area 152.

This is followed by the aforementioned sending of modification data TD by configuration process tsk2 to data memory circuit 15, which is represented as step 202. After program code $C_{152}$ has been transferred completely, particularly error-free, by configuration process tsk2 into memory area 152, in step 203, configuration process tsk2 sends an end-of-transmission characterizing command EOT to coordination process tsk4.

To reconfigure field mounted device electronics 1, it is now only necessary to activate memory area 152 with program code $C_{152}$. Since only one configuration of field mounted device electronics 1 may be valid at a time, i.e., since only one of memory areas 151, 152 may be activated at the same time, the activated memory area 151 must first be deactivated.

As shown in FIG. 3, the deactivation of memory area 151 and the activation of memory area 152 are carried out in a single step 500, which is also controlled by coordination process tsk4. A digital selection signal $x_{14}$ for deactivating memory area 151 and activating memory area 152 is generated by control circuit 14. Selection signal $x_{14}$ may be, for example, a write instruction addressed and sent to data memory circuit 15 and serving to replace a persistently stored first branch address, which refers to memory area 151, by a second branch address, which refers to memory area 152; furthermore, the write instruction serving as the selection signal $x_{14}$ may cause a coded identification of the first branch address, which controls the computational process, to be replaced by a coded identification of the second branch address.

Since memory areas 151, 152 are practically operated as exchange buffers, field mounted device electronics 1 are in a critical state for only a short duration, namely for the time of switching from activated memory area 151 to activated memory area 152, during which the first configuration is out of operation and the second configuration is not yet in operation. The switching of memory areas 151, 152 is accomplished by a single write access to data memory circuit 15 and can be readily buffered, using in particular the energy reserves stored in energy storage circuit 17. Thus, during reconfiguration and/or after a failure of the above-mentioned external power supply, the currently valid software, and hence field mounted device electronics 1, is always in an executable condition.

After completion of step 500, computational process tsk1, as shown schematically in FIG. 3 as step 101, can execute program code $C_{152}$ which is contained in memory area 152. The activated program code $C_{151}$ may, of course, be replaced by another program code in the manner described above.

According to another preferred development of the method of the invention, prior to the starting of configuration process tsk2, program code $C_{151}$, which is contained in memory area 151, is transferred into memory area 152 by read/write operations controlled by microprocessor 141, so that a backup copy of program code $C_{151}$ is retained. Thus, program code $C_{151}$ is available with a high degree of probability even in the event of a software and/or hardware error in memory area 151, and can be reactivated in a simple manner using, for example, a further selection signal that activates memory area 152. The copying of program code $C_{151}$ can be done immediately after the loading of program code $C_{151}$ or after activation of memory area 151, for example. In an analogous manner, program code $C_{152}$ can be copied from memory area 152 to memory area 151 after deactivation of memory area 151.

Data memory circuit 15 can advantageously be implemented as a monolithic circuit comprising memory area 151, 152. Memory area 151 and/or memory area 152 can also be implemented as modules that are permanently or nonpermanently coupled to bus system 12, the nonpermanent connection being preferably a plug-in connection. In that case, activated memory area 152 may also be implemented with an external memory circuit, e.g., a data memory circuit in the aforementioned programming device connected to field mounted device electronics 1, to which field mounted device electronics 1 have at least temporary read access.

According to a further preferred development of the field mounted device of the invention, data memory circuit 15 further comprises a temporarily activatable third memory area 153 for storing a third program code $C_{153}$ which represents a third configuration of the field mounted device.

Figure 4:
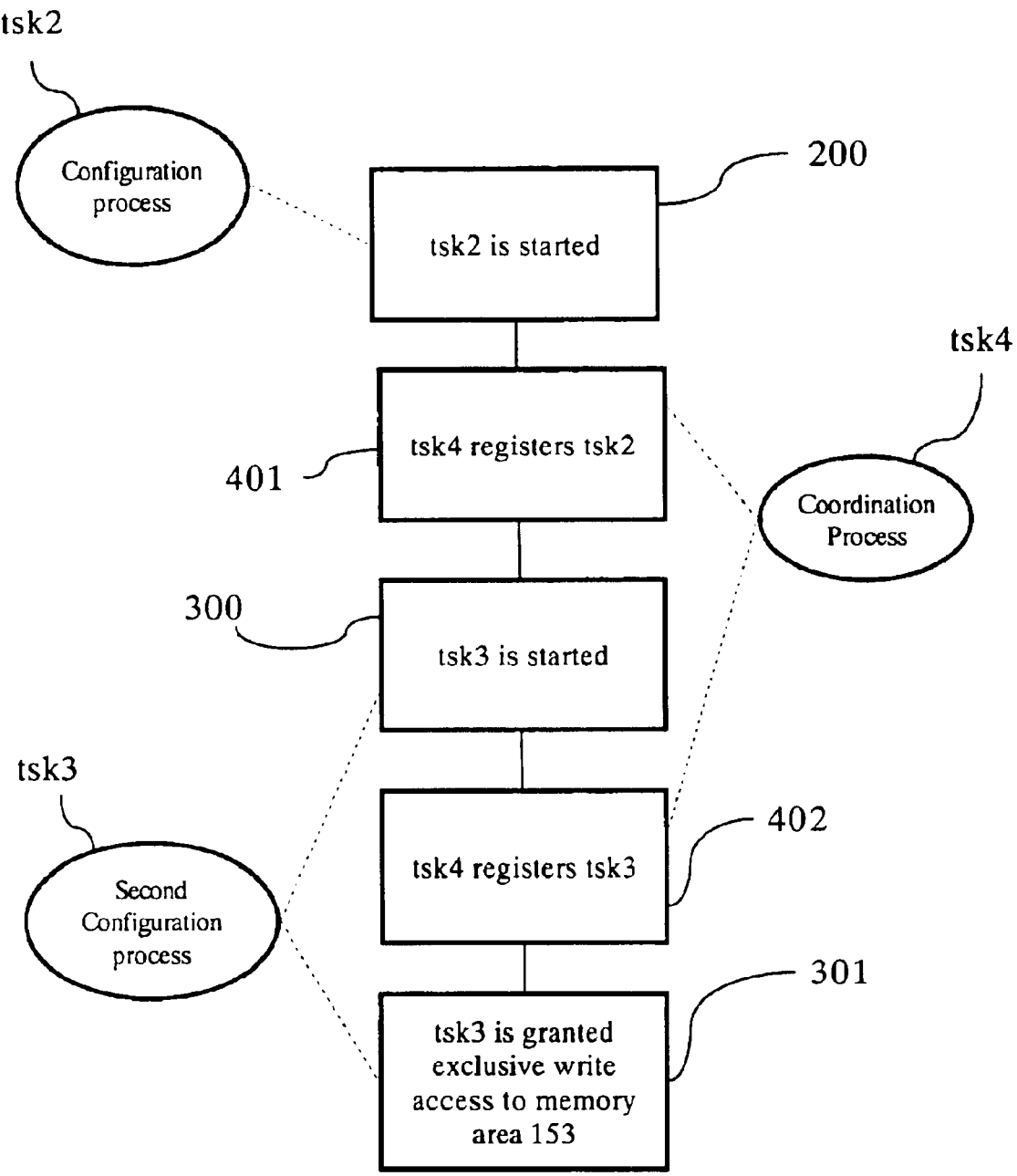
FIG. 4 is a flowchart showing the steps of a development of the method in accordance with the invention.

According to a further preferred development of the method of the invention, after registration of configuration process tsk2 in coordination process tsk4, a second configuration process tsk3 is started such that the two configuration processes tsk2, tsk3 run in parallel, i.e., practically simultaneously, as represented in FIG. 4 by a step 300. Then, in a step 402, configuration process tsk3 is also registered in coordination process tsk4, and in a step 301, currently deactivated memory area 153 is reserved for configuration process tsk3. The reserving of memory area 153 is done analogously to the reserving of memory area 152 that configuration process tsk3 has exclusive write access to memory area 153. By means of coordination process tsk4, memory area 153 is simultaneously adjusted so that computational processes such as computational process tsk1 have neither read nor write access to it.

Furthermore, configuration process tsk2 cannot write data into memory area 153, either.

According to a further preferred development of the method of the invention, after registration of configuration process tsk2, memory area 152 is adjusted by coordination process tsk4 so that configuration process tsk3 has read access to memory area 152. Thus, the modifications made to the software in memory area 152 by configuration process tsk2 can be followed by configuration process tsk3 and be taken into account in the creation of program code $C_{153}$.

While the invention has been illustrated and described in detail in the drawings and forgoing description, such illustration and description is to be considered as exemplary not restrictive in character, it being understood that only exemplary embodiments have been shown and described and that all changes and modifications that come within the spirit and scope of the invention as described herein are desired to protected.

What is claimed is:

1. A method for programming a field mounted device having a memory, the method comprising the steps of:
   running a computational process having data read access to an activated first memory area storing a prognmable first device configuration;
   deactivating the first memory area during on-line operation of the device, wherein said step comprises precluding said computational process to access the first memory area; and
   activating a deactivated second memory area storing a programmable second device configuration during on-line operation of the device, wherein said step comprises granting said computational process data read access to the second memory area.

2. The method of claim 1, further comprising the steps of:
   running a first configuration process having data read and write access to the deactivated second memory area; and
   storing data in the second memory area for modifying the second device configuration in the second memory area.

3. The method of claim 2, further comprising the step of executing the first device configuration in the first memory area by the computational process during running the first configuration process.

4. The method of claim 2, further comprising the steps of:
   running a second configuration process having data read and write access to a deactivated third memory area; and
   storing data in the third memory area.

5. The method of claim 4, further comprising the steps of:
   precluding the second configuration process access to the second memory area by granting the first configuration process an exclusive access to the second memory area;
   modifying via said second configuration process the second device configuration in the second memory area; and
   granting the computational process access to the second memory area after said modifying step.

6. The method of claim 2, further comprising the step of storing the first device configuration into the second memory area.

7. The method of claim 1, further comprising the steps of:
   writing over a first branch address that references the first memory area with a second branch address that references the second memory area for deactivating the first memory area and activating the second memory area in a single write access.

8. The method of claim 7, further comprising the steps of:
   deactivating the first memory area upon the occurrence of a hardware or software error in the first memory area; and
   activating the second memory area upon said occurrence of said error.

9. The method of claim 7, further comprising the step of copying the first device configuration from the first memory area into the second memory area.

10. The method of claim 9, further comprising the step of executing the first device configuration in the first memory area by the computational process during the copying step.

11. A programmable field mounted device, comprising:
    a memory circuit including a plurality of memory areas, each memory area storing program codes, each memory area selectively activated;
    a control circuit configured to generate a selection signal, the selection signal activating one of the plurality of memory areas during on-line operation of the device to create an activated memory area containing a first program code representing a first device configuration, and deactivating the one of the remaining memory areas during on-line operation of the device to create a deactivated memory area for storing a second program code representing a second device configuration.

12. The device of claim 11, wherein the control circuit includes a microprocessor, the microprocessor having read access to the activated memory area for executing the first program code.

13. The device of claim 12, wherein the control circuit is further configured to provide the microprocessor read access to the memory area containing the second program code for executing the second program code.

14. The device of claim 11, further comprising a configuration device configured to modify the second program code in the deactivated memory area.

15. The device of claim 14, wherein the control circuit is configured to grant the configuration device read and write access to the deactivated memory area for modifying the second program code.

16. The device of claim 11, wherein the control circuit is further configured to deactivate the activated memory area containing the first program code and activate the deactivated memory area containing the modified second program code.

17. The device of claim 16, wherein the control circuit is further configured to provide the microprocessor read access to the memory area containing the second program code for executing said program code.

18. The device of claim 11, wherein the deactivated memory area containing the second program code is activated by writing in the memory circuit a branch address corresponding to said memory area.

19. The device of claim 11, wherein the activated memory area containing the first program code is deactivated by writing over a branch address in the memory circuit corresponding to said memory area address with the branch address corresponding to the memory area containing the second program code.

20. The device of claim 11, wherein the memory circuit is a non-volatile memory.

21. The device of claim 11, wherein the memory circuit is an EEPROM.

22. The device of claim 11, further including an energy storage device configured to store energy for at least one write access to the memory circuit.

23. A method for programming a field mounted device running a computational process, the method comprising the steps of:

activating a first memory area storing a first programmable configuration;

deactivating a second memory area storing a second programmable configuration;

configuring the second memory area with a modification of the second programmable configuration; and coordinating the configuration of the second memory area during on-line operation of said device with the computational process, the coordination of the configuration of the second memory area including the steps of simultaneously executing the first programmable configuration in the first memory area by the computational process during configuration of the second memory area with a modification of the second programmable configuration, deactivating the first memory area storing the first programmable configuration upon completion of configuring the second memory area with a modification of the second programmable configuration, and activating the second memory area upon completion of configuring the second memory area with a modification of the second programmable configuration.

24. The method of claim 23, wherein the step of activating the second memory area and deactivating the first memory area comprises the step of writing over a first branch address that references the first memory with a second branch address that references the second memory area.

25. The method of claim 23, wherein the step of coordinating the configuration of the second memory area with the computational process further comprises the steps of:

precluding the computational process access to the second memory area;

granting a configuration process exclusive access to the second memory area; and granting the computation process access to the second memory area after the modifying step.

26. The method of claim 23, wherein the step of activating the second memory area and deactivating the first memory area is accomplished by a single write access to a branch address.

27. A method for reconfiguring a programmable field mounted device during on-line operation of said field mounted device, said field mounted device including field mounted device electronics and said field mounted device sending data to a process monitoring system via a data transmission system, said method comprising the steps of:

running via a microprocessor of said field mounted device electronics a computational process executing a first program code stored in a data memory circuit of said field mounted device electronics, said first program code representing a first configuration of said field mounted device and said first program code being stored within a first memory area of said data memory circuit;

transferring to a second memory area of the data memory circuit a second program code representing a second configuration of said field mounted device, said second memory area being deactivated to preclude said computational process to access the second memory area;

using said modification data to write data to said data memory circuit, said data representing said second program code;

terminating the transfer of modification data;

activating the second memory area to grant said computational process to access said second memory; and executing via the microprocessor said second program code;

wherein the step of transferring to said field mounted device said second program code comprises a step of sending modification data from an external programming device via said data transmission system to said field mounted device during running said computational process.

28. The method as claimed in claim 27, wherein the data memory circuit comprises a second memory area, said method further comprising a step of deactivating said second memory area of said data memory circuit to preclude said computational process to access said second memory area.

29. The method as claimed in claim 28, wherein said step of executing via the microprocessor said second program code comprises a step of activating said second memory area of said data memory circuit to grant said computational process data read access said second memory area.

30. The method as claimed in claim 29, further comprising a step of deactivating said first memory area of said data memory circuit to preclude said computational process data read access said first memory area.

31. The method as claimed in claim 27, further comprising a step of using a sensor being connected with said field mounted device electronics for sensing a process variable from a process to be monitored using said field mounted device.

32. The method as claimed in claim 31, further comprising a step of generating a measurement signal representing said process variable.

33. The method as claimed in claim 32, wherein the field mounted device electronics further comprises a communication interface coupled to said data transmission system, said method further comprising a step of using said communication interface to send said measurement signal to said process monitoring system.

* * * * *